United States Patent
Williams

[19]

[11] Patent Number: 6,026,339
[45] Date of Patent: Feb. 15, 2000

[54] APPARATUS AND METHOD FOR PROVIDING AN INERTIAL VELOCITY SIGNAL IN AN ACTIVE SUSPENSION CONTROL SYSTEM

[75] Inventor: Daniel E. Williams, W. Lafayette, Ind.

[73] Assignee: TRW Inc., Lyndhurst, Ohio

[21] Appl. No.: 08/873,638

[22] Filed: Jun. 12, 1997

[51] Int. Cl.$^7$ .................................................. B62D 24/04
[52] U.S. Cl. ........................ 701/37; 701/39; 180/89.12; 280/5.515
[58] Field of Search .................... 701/37, 39; 280/5.515, 280/5.514, 5.507, 6.157, 6.159; 180/89.12

[56] References Cited

U.S. PATENT DOCUMENTS

| | | |
|---|---|---|
| 4,700,971 | 10/1987 | Doi et al. ..................................... 177/2 |
| 4,907,154 | 3/1990 | Yasuda et al. ............................. 701/37 |
| 4,916,632 | 4/1990 | Doi et al. .............................. 280/5.515 |
| 5,063,512 | 11/1991 | Kamimura et al. ........................ 701/37 |
| 5,071,159 | 12/1991 | Kamimura et al. ................... 280/5.507 |
| 5,218,546 | 6/1993 | Bradshaw et al. ......................... 701/37 |
| 5,322,320 | 6/1994 | Sahashi et al. ............................ 701/37 |
| 5,346,242 | 9/1994 | Karnopp ............................... 280/6.159 |
| 5,384,706 | 1/1995 | Uchiyama et al. ................... 280/5.514 |
| 5,402,341 | 3/1995 | Liubakka et al. ........................ 180/412 |
| 5,570,289 | 10/1996 | Stacey et al. ......................... 280/5.504 |
| 5,725,066 | 3/1998 | Beard et al. .......................... 180/89.12 |
| 5,781,873 | 7/1998 | Sasaki ....................................... 701/37 |

FOREIGN PATENT DOCUMENTS

| | | |
|---|---|---|
| 0579182A1 | 1/1994 | European Pat. Off. . |
| 0739766A2 | 10/1996 | European Pat. Off. . |
| 05099271 | 4/1993 | Japan . |
| 07117432 | 5/1995 | Japan . |
| 08058340 | 3/1996 | Japan . |

*Primary Examiner*—Tan Nguyen
*Attorney, Agent, or Firm*—Tarolli, Sundheim, Covell, Tummino & Szabo L.L.P.

[57] ABSTRACT

An apparatus (10) and a method provide a signal (12) indicative of velocity of a mass (18). An acceleration sensor (64) senses acceleration of the mass (18) and provides an acceleration signal (66) indicative of the acceleration of the mass. A displacement sensor (70) senses displacement of the mass (18) and provides for a displacement signal (72) indicative of displacement of the mass. Two filters (68 and 74) operate upon the acceleration and displacement signals (66 and 72) respectively, and the filter outputs are summed to provide the velocity signal (12). In one example, an active suspension system (16) utilizes the velocity signal (12) to control relative movement between the mass (18), as a sprung mass, and an unsprung mass (20). The suspension system (16) includes a controller (54), which receives the velocity signal (12) and provides a control signal (56) utilizing the velocity signal. A force actuator (30), between the sprung and unsprung masses (18 and 20), is controlled in response to the control signal (56).

24 Claims, 5 Drawing Sheets

6,026,339

APPARATUS AND METHOD FOR PROVIDING AN INERTIAL VELOCITY SIGNAL IN AN ACTIVE SUSPENSION CONTROL SYSTEM

TECHNICAL FIELD

The present invention is directed to provision of a signal indicative of velocity of a mass and is particularly directed to provision of a signal indicative of velocity of a mass for use within an active suspension system.

BACKGROUND OF THE INVENTION

Suspension systems for vehicles are well known in the art. Suspension systems have as their goal the control of relative motion between a sprung mass and an unsprung mass of a vehicle. One example of a system is a chassis suspension system of a vehicle, wherein the sprung mass includes the chassis and the unsprung mass includes the vehicle's suspension arms, wheels, tires, etc. Another example of a suspension system is a cab suspension system for a semi-truck tractor, wherein the sprung mass includes the tractor cab and the unsprung mass includes the tractor chassis.

Active suspension systems have at least one variable force actuator between the sprung and unsprung masses, and a controller for controlling the force actuator so as to control the system's inertia damping gain. The controller monitors various vehicle conditions to determine actuator control. In particular, the controller requires an inertially referenced velocity measurement of the sprung mass.

In practical experience, one economical manner to acquire an inertially referenced velocity measurement is to integrate a signal from an accelerometer transducer mounted on the sprung mass. Specifically, one common way to implement the integration process is to use a bandpass filter for filtering the signal from the accelerometer. The bandpass filter behaves as a pseudo-integrator within a range of frequencies at and around the resonant frequency of the sprung mass. Thus, the bandpass filter provides a velocity indicative signal to the controller. However, the bandpass filter method has performance limitations. For example, given sufficient force actuator dynamics, the bandpass filter may limit the achievable inertia damping gain.

SUMMARY OF THE INVENTION

In accordance with the present invention, an apparatus provides a signal indicative of velocity of a mass. Means sense acceleration of the mass and provide an acceleration signal indicative of acceleration of the mass. Means sense displacement of the mass and provide a displacement signal acceleration signal and the displacement signal together to provide a signal indicative of velocity of the mass. Preferably, the apparatus is in an active suspension control system of an active suspension for the mass. The active suspension has a force actuator mechanism and the signal indicative of velocity of the mass is used to provide an actuator mechanism control signal.

In accordance with another aspect of the present invention, a method provides a signal indicative of velocity of a mass. Acceleration of the mass is sensed. An acceleration signal is provided which is indicative of acceleration of the mass. Displacement of the mass is sensed. A displacement signal is provided which is indicative of the sensed displacement of the mass. The acceleration signal and the displacement signal are processed together to provide a signal indicative of velocity of the mass. Preferably, the signal indicative of velocity of the mass is used to provide a control signal for an actuator mechanism of an active suspension for the mass.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
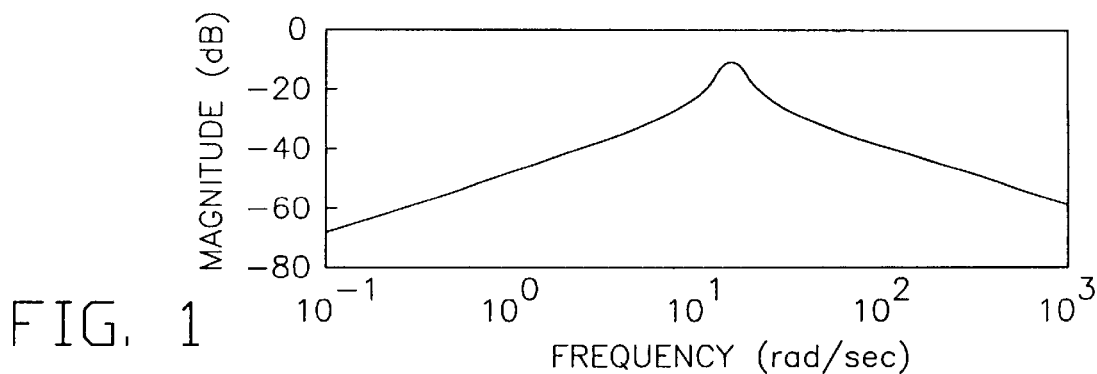
FIG. 1 is an open loop Bode plot of an idealized response in an active suspension system utilizing inertial velocity of a sprung mass.
Figure 2:
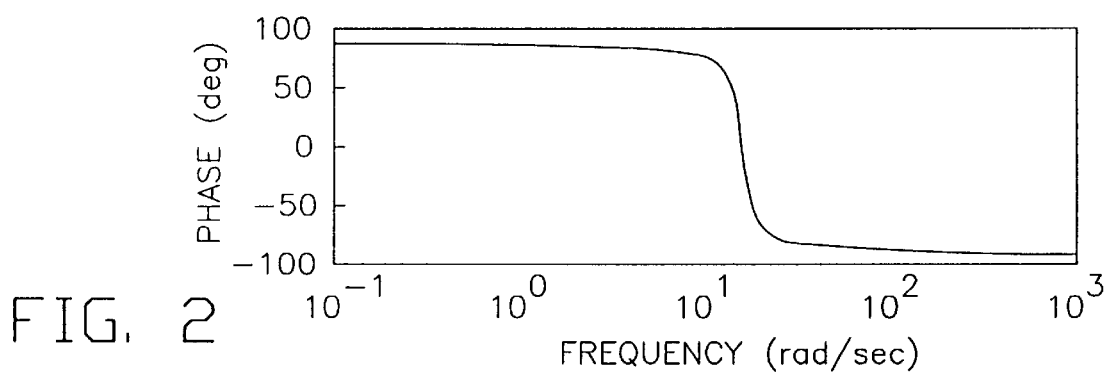
FIG. 2 is a corollary to FIG. 1 and is a plot showing phase for the idealized response.

An active suspension system for controlling relative movement between sprung and unsprung masses requires a velocity measurement of the sprung mass. FIG. 1 is a plot of magnitude vs. frequency and FIG. 2 is a corollary plot of phase vs. frequency for an idealized open loop response scenario of a suspension system with inertial damping that utilizes an inertially referenced velocity measurement, i.e., velocity measured with respect to a motionless reference frame ("inertial velocity"). The plots of FIGS. 1 and 2 are based upon mass and stiffness parameters which are typical in known active suspension systems. Further, the plots of FIGS. 1 and 2 show ideal, desirable stable properties. For example, the maximum phase lead and lag is 90 degrees.

Figure 3:
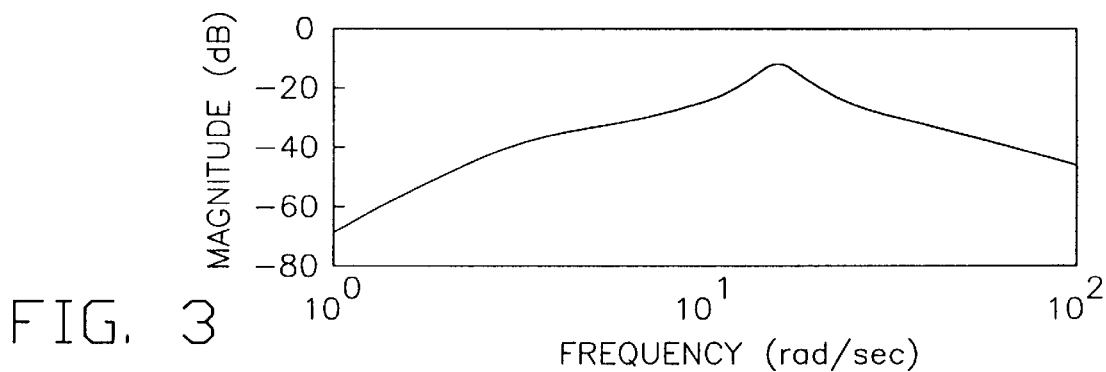
FIG. 3 is similar to FIG. 1 and illustrates a plot for a system utilizing only a bandpass-integrated acceleration signal to indicate velocity.
Figure 4:
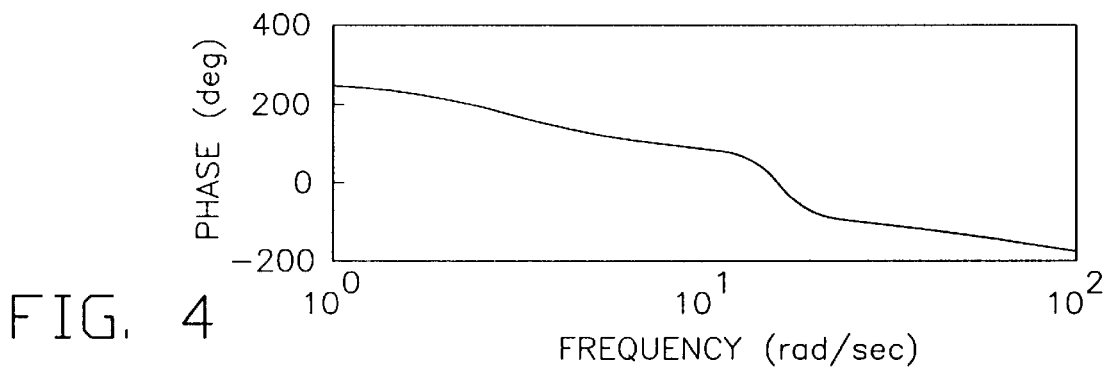
FIG. 4 is similar to FIG. 2 and is a corollary to FIG. 3.

A typical approach for providing a signal which is indicative of velocity of the sprung mass is the bandpass filter, pseudo-integrator, method. Using this method, an accelerometer signal is applied to a bandpass filter and the resultant signal is taken as a velocity indicative signal. Examples of typical behavior characteristics associated with the bandpass filter method are plotted in FIGS. 3 and 4. Specifically, it is to be noticed that at a low frequency, the signal phase passes through 180 degrees of lead, and at a high frequency, the signal phase passes through 180 degrees of lag. In the bandpass filter method, the low frequency cross-over determines the gain level. Thus, the cross-over point determines the amount of inertial damping that can be applied.

Figure 5:
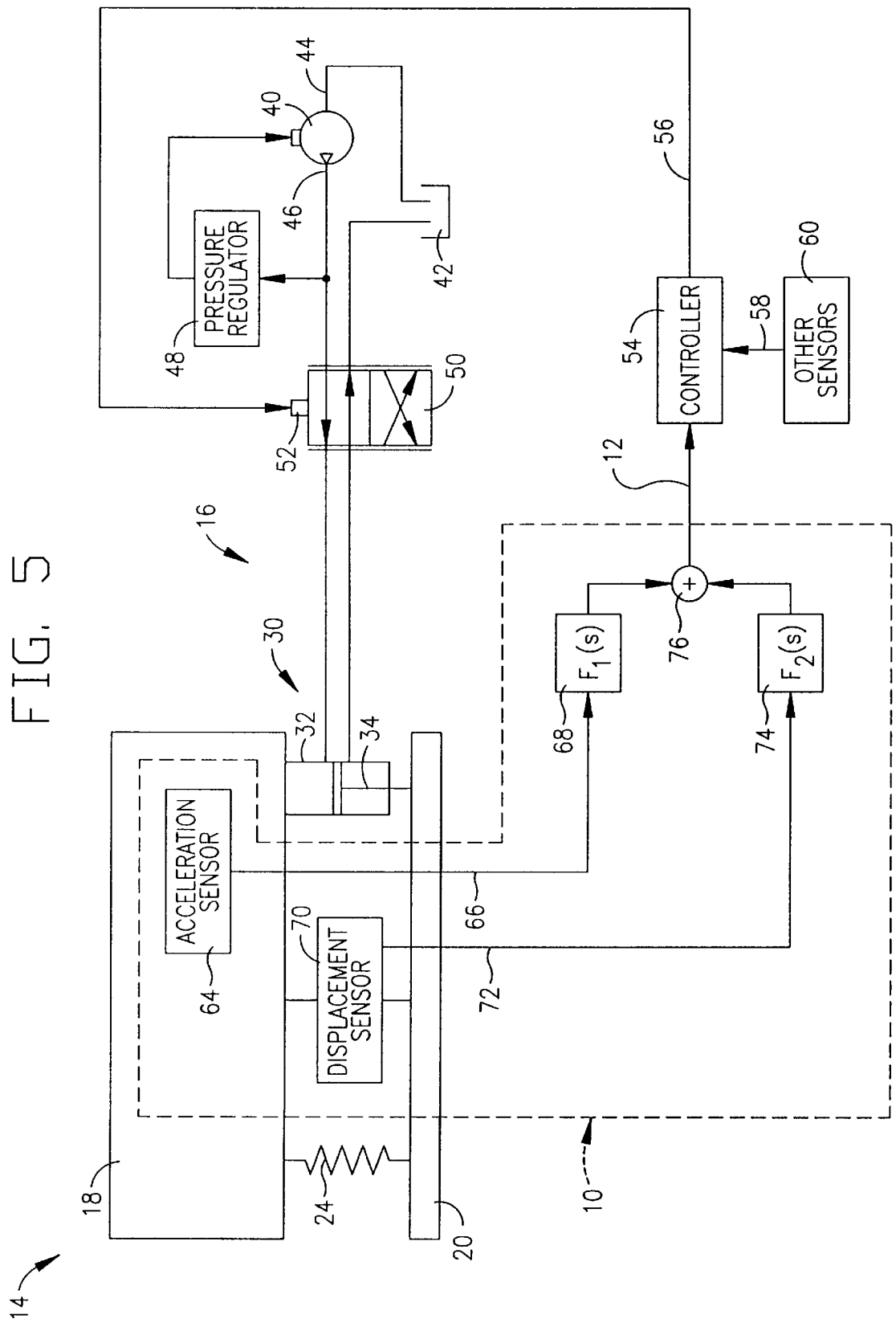
FIG. 5 is a schematic illustration of an active suspension system in accordance with the present invention.

In order to improve performance, the present invention yields an inertial velocity indication apparatus 10 (FIG. 5) which provides an inertial velocity signal 12. In FIG. 5, a portion of a vehicle 14 having an active suspension system 16 is schematically illustrated. The vehicle 14 has a sprung mass 18 and an unsprung mass 20 which are relatively movable and which are connected via at least one passive suspension device 24 (represented in FIG. 5 by a spring).

The active suspension system 16 controls relative motion between the sprung and unsprung masses 18 and 20. The inertial velocity signal 12 is indicative of the inertial velocity of the sprung mass 18. The velocity signal 12 is used in the control process of controlling the relative movement of the sprung and unsprung masses 18 and 20 by the suspension system 16.

It will be appreciated by a person of ordinary skill in the art that typically the sprung mass 18 includes part of the vehicle chassis and the unsprung mass 20 includes a suspension arm, a wheel, and a tire of the vehicle (i.e., a wheel assembly). It will be further appreciated by a person of ordinary skill in the art that the vehicle 14 may have a plurality of other active suspension systems 16 such as truck cab and chassis suspension in which the cab is the sprung mass and the chassis is the unsprung mass. Therefore, a plurality of sprung and unsprung masses may be part of an overall vehicle active suspension system having plural components for the plurality of sprung and unsprung masses. For the purpose of explanation only, the sprung and unsprung masses 18 and 20 are shown in FIG. 5 represent one of the four corners the vehicle 14 (i.e., one wheel assembly as the unsprung mass).

Within the suspension system 16, a force actuator 30 connects the sprung and unsprung masses 18 and 20. The actuator 30 includes a cylindrical housing 32 connected to the sprung mass 18. A piston 34 of the actuator 30 is telescopically received within the housing 32 and is connected to the unsprung mass 20. In the actuator 30, a head of the piston 34 divides the area within the housing 32 into two variable volume fluid chambers. The actuator 30 applies a variable force between the sprung and unsprung masses 18 and 20, dependent upon the fluid pressures within the chambers of the actuator, as will be understood by a person of ordinary skill in the art.

A variable displacement pump 40 and a reservoir 42 are provided for the active suspension system 16. In a preferred embodiment, the pump 40 is a swash plate pump. An intake 44 of the pump 40 is in fluid communication with the reservoir 42. An outlet 46 of the pump 40 is connected to a pressure regulator 48 for the pump. The pump 40 and the reservoir 42 are in fluid communication with a spool valve 50. In the preferred embodiment, the valve 50 is an Apitech pressure controlled solenoid valve. The valve 50 is in fluid communication with the chambers of the actuator 30. The valve 50 includes a torque motor 52 for controlling operation of the valve and, in turn, fluid communication between the pump 40 and reservoir 42 with the chambers of the actuator 30. The valve arrangement permits fluid pressure from the pump 40 to communicate with one of the chambers, and permits fluid communication from the other of the chambers to the reservoir 42. Accordingly, the actuator 30 applies a variable force between the sprung and unsprung masses 18, 20 and can relatively drive the sprung and unsprung masses toward or away from each other. Further, when it is desired to maintain the relative positions of the sprung and unsprung masses 18 and 20, the valve 50 is positioned so as to block fluid communication between the actuator 30 and the pump 40 and the reservoir 42.

Operation of the torque motor 52 is controlled by a controller 54. The controller 54 monitors inputs from a plurality of sources indicative of various vehicle operation characteristics. In response to these inputs, the controller 54 determines the needed operation of the valve 50 and provides a control signal 56 to the torque motor 52 of the valve. Controlling the valve 50 results in control of the actuator 30, and thus determines the amount of force to be applied between the sprung and unsprung asses 18 and 20.

Specifically, the controller 54 receives the velocity signal 12 from the velocity indication apparatus 10. The controller also receives sensor signals 58 from a plurality of other sensors 60. The signals 58 provided by the other sensors 60 are indicative of vehicle static or dynamic operating characteristics or metrics which are useful for controlling the relative motion between the sprung and unsprung masses 18 and 20. For example, the other sensors 60 sense vehicle speed, vertical acceleration of the unsprung mass 20, vertical speed of the unsprung mass, vehicle roll, pitch, heave, warp, or yaw, corner load, etc. The other sensors 60 are not part of the present invention, are well known in the art, and are not discussed in detail because a person of ordinary skill in the art will understand their function in an active suspension system. A person of ordinary skill in the art will appreciate the operation of the controller 54 to control the amount of force applied between the sprung and unsprung masses 18 and 20, and thus provide improved performance of the vehicle.

Focusing now upon the velocity indication apparatus 10 of the present invention. The sprung mass 18 is subject to various forces which urge the sprung mass to move relative to the unsprung mass 20. The forces urging movement include vertical, as viewed in FIG. 5, heave force, and other forces, which cause vertical movement of the sprung mass 18 relative to the unsprung mass 20. During relative vertical movement between the sprung and unsprung masses 18 and 20, the sprung mass has an inertial velocity which is measured by the velocity indication apparatus 10.

The velocity indication apparatus 10 includes an acceleration sensor 64 fixedly mounted on the sprung mass 18. The acceleration sensor 64 provides an output signal 66 indicative of the vertical acceleration of the sprung mass 18. The acceleration signal 66 from the acceleration sensor 64 is provided to a first transfer filter 68. In one embodiment, the first filter 68 is a bandpass filter acting as a pseudo-integrator. The transfer function of the first filter 68 is represented by the equation:

$$F_1(s) = \frac{s}{s^2 + 2\zeta\omega s + \omega^2}$$

wherein:

$F_1(s)$=output from the first filter;

$\zeta$=damping ratio; and $\omega$=natural frequency of the first filter.

The velocity indication apparatus 10 further includes a displacement sensor 70 for measuring relative displacement between the sprung and unsprung masses 18 and 20 and for providing a signal 72 indicative thereof. The displacement signal 72 is provided to a second transfer filter 74. The transfer function of the second filter 74 is represented by the equation:

$$F_2(s) = \frac{2\zeta\omega s\left(s + \dfrac{\omega}{2\zeta}\right)}{s^2 + s\zeta\omega + \omega^2}$$

wherein:

$F_2(s)$=output from the second filter;

$\zeta$=damping ratio; and $\omega$=natural frequency of the second filter.

The outputs of the first and second filters 68 and 74 are provided to a summation device 76. The output signal from the summation device 76 is the velocity signal 12.

Specifically, the output from the summation device 76 is represented by the equation:

$$\dot{X}_{out} = \left(\frac{s}{s^2 + 2\zeta\omega s + \omega^2}\right)\ddot{X}_{out} + \left(\frac{2\zeta\omega s\left(s + \frac{\omega}{2\zeta}\right)}{s^2 + 2\zeta\omega s + \omega^2}\right)X_{out}$$

wherein:

$\dot{X}_{out}$=velocity signal 12;
$\ddot{X}_{out}$=acceleration signal 66;
$X_{out}$=displacement signal 72;
$\zeta$=damping ratio; and
$\omega$=natural frequency of the first and second filters.

Accordingly, it is to be appreciated that the output from the first and second filters 68 and 74 are complimentary, and together provide the velocity signal 22 with a high level of accuracy over a range of frequencies.

Figure 6:
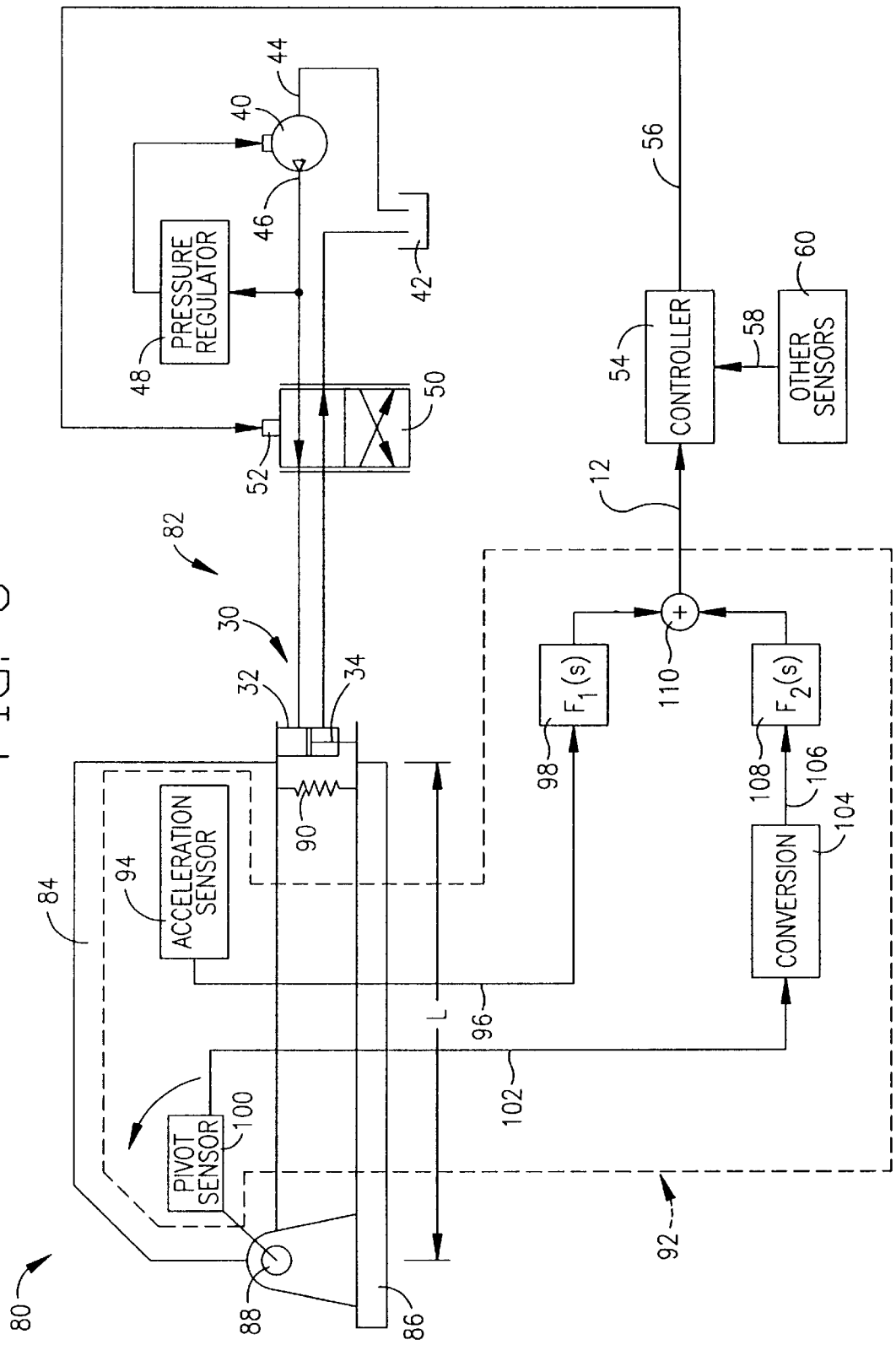
FIG. 6 is a schematic illustration of a truck cab active suspension system in accordance with the present invention.

Referring to FIG. 6, a second vehicle 80, having an active suspension system 82 in accordance with the present invention, is illustrated. The second vehicle 80 is the tractor of a tractor-trailer truck, which is commonly referred to as a semi-truck. The tractor 80 includes a tractor of a tractor-trailer truck, which is commonly referred to as a semi-truck. The tractor 80 includes a passenger cab 84 and a chassis 86 which is pivotally connected to the chassis at a pivot 88. At a location spaced away from the pivot 88, the cab 84 is connected to the chassis 86 by one or more passive suspension devices 90 (e.g., a spring). Accordingly, the cab 84 is a sprung mass and the chassis 86 is an unsprung mass.

The suspension system 82 is similar to the suspension system 16 of FIG. 5, and elements with identical functions are identified by identical reference numerals in FIGS. 5 and 6. The actuator 30 (FIG. 6) of the suspension system 82 connects the cab 84 to the chassis 86 at a location away from the pivot 88. Accordingly, the actuator 30 can drive the cab 84 to pivot toward or away from the chassis 86 at the location of the actuator, or the actuator can maintain the relative positions of the cab and the chassis.

A velocity indication apparatus 92, in accordance with the present invention, provides the velocity signal 12 for the suspension system 82 of FIG. 6. The velocity indication apparatus 92 is comparable to the velocity indication apparatus 10 of FIG. 5. However, the velocity indication apparatus 92 of FIG. 6 provides a velocity signal 12 based upon the velocity of the pivoting cab 84.

The velocity indication apparatus 92 includes an acceleration sensor 94 fixedly mounted on the cab 84. The acceleration sensor 94 provides an output signal 96 which is indicative of the acceleration of the cab at a location spaced away from the pivot 88. Because the acceleration sensor 94 is spaced away from the pivot 88, the component of the perceived acceleration in the horizontal direction can be neglected and the acceleration signal 96 can be used for indicating vertical acceleration. The acceleration signal 96 is provided to a first transfer filter 98. The transfer function of the first filter 98 is the same as the transfer function for the first filter 68 of FIG. 5.

A pivot sensor 100 (FIG. 6) provides a signal 102 indicative of relative pivot or angular displacement between the cab 84 and the chassis 86 to a conversion device 104. The conversion device 104 converts the pivot signal 102 to a signal 106 which is indicative of vertical displacement. The conversion is accomplished by use of the known distance L between the pivot 88 and the actuator 30. The vertical displacement signal 106 is provided to a second transfer filter 108. The transfer function of the second filter 108 is the same as the transfer function of the second filter 74 of FIG. 5.

The outputs of the first and second filters 98 and 108 (FIG. 6) are provided as inputs to a summation device 110. The output signal from the summation device 110 is the velocity signal 12. Specifically, the velocity signal 12 is again represented by the equation:

$$\dot{X}_{out} = \left(\frac{s}{s^2 + 2\zeta\omega s + \omega^2}\right)\ddot{X}_{out} + \left(\frac{2\zeta\omega s\left(s + \frac{\omega}{2\zeta}\right)}{s^2 + 2\zeta\omega s + \omega^2}\right)X_{out}$$

wherein:

$\dot{X}_{out}$=velocity signal 12;
$\ddot{X}_{out}$=acceleration signal 66;
$X_{out}$=displacement signal 72;
$\zeta$=damping ratio; and
$\omega$=natural frequency of the first and second filters.

The use of the velocity signal 12 in both the suspension system 16 of FIG. 5 and the suspension system 82 of FIG. 6 results in improved responsiveness compared to the bandpass only method. As will be appreciated by a person of ordinary skill in the art in each of the systems 16 and 82, the first transfer filter has drift and bias rejection properties because it is a bandpass, pseudo-integrating filter. Further, by virtue of a zero output value at zero frequency, the second transfer filter has similar drift and bias rejection qualities. Further, the second transfer filter is well behaved at high frequencies, unlike a simple differentiator that would differentiate the displacement signal to obtain velocity. Such a differentiator would be subject to high frequency noise amplification.

Figure 7:
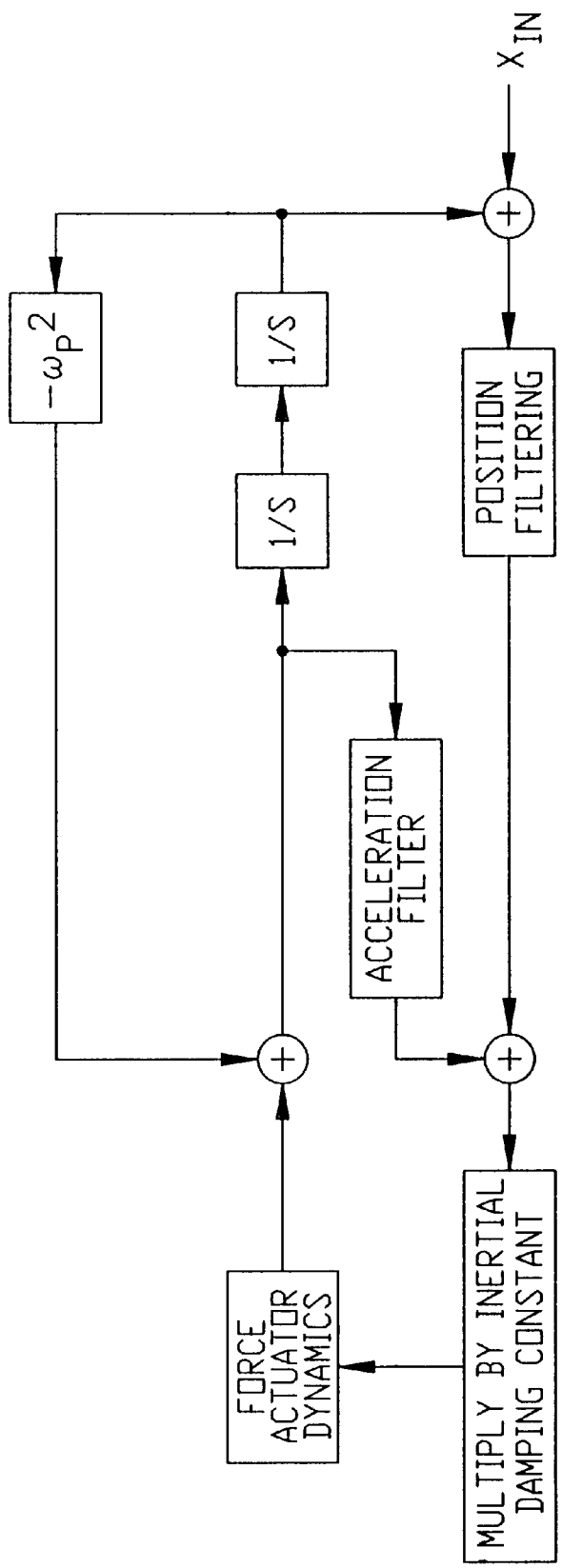
FIG. 7 is a block diagram illustrating creation of the signal indicative of velocity.

The inertial velocity signal 12 from the velocity indication apparatus 10 of FIG. 5 and the inertial velocity signal 12 from the velocity indication apparatus 92 of FIG. 6 are both modeled by FIG. 7 The term $\omega_p$ is the dynamics of the sprung mass and represents the natural frequency of the sprung mass. Specifically, $\omega_p$ is the ratio of effective mass inertia to effective stiffness. The input $X_{in}$ represents the displacement of the unsprung mass and can be considered to be a disturbance input. When the input $X_{in}$ is neglected, the summation of the results from the two filtering steps provides the inertial velocity. The inertial velocity is multiplied by the inertial damping constant to yield the actuator force demand.

For closed loop stability purposes, the feedback signal is the inertially reference velocity. Thus, the control loop is stable at low frequencies, and the overall loop stability is determined by the gain margin at the force actuator's 90 degree phase lag frequency.

It should be noted that if $X_{in}$ is considered to be non-zero (e.g., for a relative position measurement), the closed loop remains stable. The input $X_{in}$ is merely a disturbance input injected into the closed loop. Because of the injected disturbance input, the position filtering process colors this input, and the result is multiplied by a high inertial damping gain. The overall result is that the use of relative position causes lower system performance than the use of inertial position.

Figure 8:
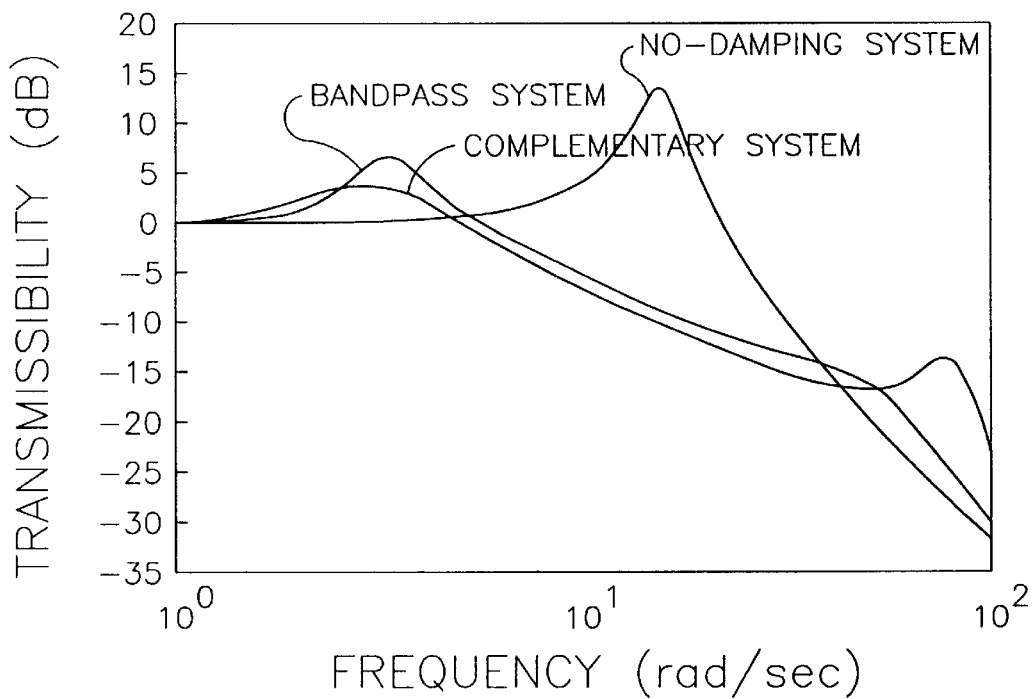
FIGS. 8 and 9 are plots showing comparison of the performance of an active suspension system utilizing the present invention with other active suspension systems.
Figure 9:
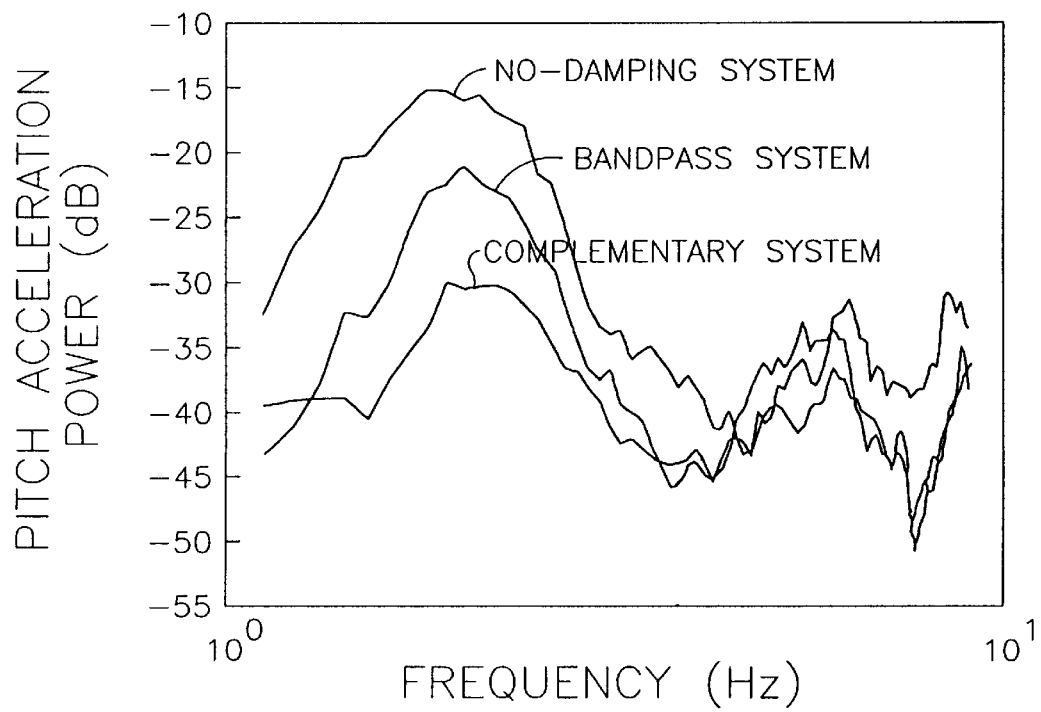

A comparison of the performance of a suspension system utilizing the present invention (referred to as a complementary filter system) compared to other systems (referred to as a no-damping system and a bandpass system) for pivoting cabs is provided by the plots of FIGS. 8 and 9. As shown in FIG. 8, both the complementary filter system and the bandpass system damp the sprung mass resonance. The bandpass system exhibits a resonance at the natural frequency of the bandpass filter. As shown in FIG. 8, the complementary filter system does have two frequencies of amplification. The first amplification is near the natural frequency and the second amplification occurs at the natural frequency of the force actuator.

FIG. 9 compares pivot suspension systems (such as illustrated in FIG. 6) and shows that the pitch acceleration for the complementary filter system (i.e., unitizing the present invention) is generally the lowest. In the complementary filter system, the pitch acceleration is reduced to roughly the level of background noise beyond the bandwidth of the control system.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for providing a signal indicative of velocity of a mass, said apparatus comprising:

means for sensing acceleration of the mass and for providing an acceleration signal indicative of acceleration of the mass;

means for sensing displacement of the mass and for providing a displacement signal indicative of displacement of the mass; and means for processing said acceleration signal and said displacement signal together to provide a signal indicative of velocity of the mass.

2. An apparatus as set forth in claim 1, wherein said means for processing includes a first transfer filter means for receiving said acceleration signal, for operating upon said acceleration signal and for providing a first filtered signal, and a second transfer filter means for receiving said displacement signal, for operating upon said displacement signal and for providing a second filtered signal.

3. An apparatus as set forth in claim 2, wherein said means for processing includes means for combining said first and second filtered signals to provide said signal indicative of velocity of the mass.

4. An apparatus as set forth in claim 3, wherein said means for combining said first and second filtered signals includes means for summing said first and second filtered signals to provide said signal indicative of velocity of the mass.

5. An apparatus as set forth in claim 4, wherein the mass is a sprung mass, and a transfer function of said first filter is in accordance with:

$$F_1(s) = \frac{s}{s^2 + 2\zeta\omega s + \omega^2}$$

and a transfer function of said filter is in accordance with:

$$F_2(s) = \frac{2\zeta\omega s\left(s + \frac{\omega}{2\zeta}\right)}{s^2 + s\zeta\omega + \omega^2}$$

wherein:
   $F_1(s)$=first signal;
   $F_2(s)$=second signal;
   $\zeta$=damping ratio; and
   $\omega$=natural frequency of the first and second filters.

6. A system for controlling a force actuator mechanism of an active suspension for a mass, said system comprising:

means for sensing acceleration of the mass and for providing an acceleration signal indicative of acceleration of the mass;

means for sensing displacement of the mass and for providing a displacement signal indicative of displacement of the mass;

means for processing said acceleration signal and said displacement signal together to provide a signal indicative of velocity of the mass; and means for providing an actuator mechanism control signal in response to at least the signal indicative of velocity of the mass.

7. A system as set forth in claim 6, wherein said means for processing includes a first transfer filter means for receiving said acceleration signal, for operating upon said acceleration signal and for providing a first filtered signal, and a second transfer filter means for receiving said displacement signal, for operating upon said displacement signal and for providing a second filtered signal.

8. A system as set forth in claim 7, wherein said means for processing includes means for combining said first and second filtered signals to provide said signal indicative of velocity of the mass.

9. A system as set forth in claim 8, wherein said means for combining said first and second filtered signals includes means for summing said first and second filtered signals to provide said signal indicative of velocity of the mass.

10. A system as set forth in claim 9, wherein the mass is a sprung mass, and a transfer function of said first filter is in accordance with:

$$F_1(s) = \frac{s}{s^2 + 2\zeta\omega s + \omega^2}$$

and a transfer function of said second filter is in accordance with:

$$F_2(s) = \frac{2\zeta\omega s\left(s + \frac{\omega}{2\zeta}\right)}{s^2 + s\zeta\omega + \omega^2}$$

wherein:
   $F_1(s)$=first signal;
   $F_2(s)$=second signal;
   $\zeta$=damping ratio; and
   $\omega$=natural frequency of the first and second filters.

11. A system as set forth in claim 6, wherein the mass is a vehicle occupant cab of a vehicle.

12. A method for providing a signal indicative of velocity of a mass, said method comprising:

sensing acceleration of the mass;
   providing an acceleration signal indicative of acceleration of the mass;
   sensing displacement of the mass;
   providing a displacement signal indicative of displacement of the mass; and
   processing the acceleration signal and the displacement signal together to provide a signal indicative of velocity of the mass.

13. A method as set forth in claim 12, wherein said step of processing the acceleration signal and the displacement signal includes: applying the acceleration signal to a first transfer filter means, operating upon the acceleration signal with the first filter means, providing a first filtered signal from the first filter means, applying the displacement signal to a second transfer filter means, operating upon the displacement signal with the second filter means, and providing a second filtered signal from the second filter means.

14. A method as set forth in claim 13, wherein said step of processing the acceleration signal and the displacement signal includes combining the first and second filtered signals to provide the signal indicative of velocity of the mass.

15. A method as set forth in claim 14, wherein said step of combining the first and second filtered signals includes summing the first and second filtered signals to provide the signal indicative of velocity of the mass.

16. A method as set forth in claim 15, wherein the mass is a sprung mass, and a transfer function of the first filter for said step of processing the acceleration signal and the displacement signal is in accordance with:

$$F_1(s) = \frac{s}{s^2 + 2\zeta\omega s + \omega^2}$$

and a transfer function of said second filter for said step of processing the acceleration signal and the displacement signal is in accordance with:

$$F_2(s) = \frac{2\zeta\omega s\left(s + \frac{\omega}{2\zeta}\right)}{s^2 + s\zeta\omega + \omega^2}$$

wherein:
 $F_1(s)$=first signal;
 $F_2(s)$=second signal;
 $\zeta$=damping ratio; and
 $\omega$=natural frequency of the first and second filters.

17. A method for controlling a force actuator mechanism of an active suspension for a mass, said method comprising:
 sensing acceleration of the mass;
 providing an acceleration signal indicative of acceleration of the mass;
 sensing displacement of the mass;
 providing a displacement signal indicative of displacement of the mass;
 processing the acceleration signal and the displacement signal together to provide a signal indicative of velocity of the mass; and
 providing an actuator mechanism control signal in response to at least the signal indicative of velocity of the mass.

18. A method as set forth in claim 17, wherein said step of processing the acceleration signal and the displacement signal includes: applying the acceleration signal to a first transfer filter means, operating upon the acceleration signal with the first filter means, providing a first filter signal from the first filter means, applying the displacement signal to a second transfer filter means, operating upon the displacement signal with the second filter means, and providing a second filtered signal from the second filter means.

19. A method as set forth in claim 18, wherein said step of processing the acceleration signal and the displacement signal includes combining the first and second filtered signals to provide the signal indicative of velocity of the mass.

20. A method as set forth in claim 19, wherein said step of combining the first and second filtered signals includes summing the first and second filtered signals to provide the signal indicative of velocity of the mass.

21. A method as set forth in claim 20, wherein the mass is a sprung mass, and a transfer function of the first filter for said step of processing the acceleration signal and the displacement signal is in accordance with:

$$F_1(s) = \frac{s}{s^2 + 2\zeta\omega s + \omega^2}$$

and a transfer function of said second filter for said step of processing the acceleration signal and the displacement signal is in accordance with:

$$F_2(s) = \frac{2\zeta\omega s\left(s + \frac{\omega}{2\zeta}\right)}{s^2 + s\zeta\omega + \omega^2}$$

wherein:
 $F_1(s)$=first signal;
 $F_2(s)$=second signal;
 $\zeta$=damping ratio;
 $\omega$=natural frequency of the first and second filters;

22. A system as set forth in claim 17, wherein the mass is a vehicle occupant cab of a vehicle.

23. An apparatus for providing a signal indicative of velocity of a mass, the mass being a spring mass, said apparatus comprising:
 means for sensing acceleration of the mass and for providing an acceleration signal indicative of acceleration of the mass;
 means for sensing displacement of the mass and for providing a displacement signal indicative of displacement of the mass; and
 means for processing said acceleration signal and said displacement signal together to provide a signal indicative of velocity of the mass;
 said means for processing including a first transfer filter means for receiving said acceleration signal, for operating upon said acceleration signal and for providing a first filtered signal, a second transfer filter means for receiving said displacement signal, for operating upon said displacement signal and for providing a second filtered signal, and means for combining said first and second filtered signals to provide said signal indicative of velocity of the mass, a transfer function of said first filter being in accordance with:

$$F_1(s) = \frac{s}{s^2 + 2\zeta\omega s + \omega^2}$$

and a transfer function of said filter is in accordance with:

$$F_2(s) = \frac{2\zeta\omega s\left(s + \frac{\omega}{2\zeta}\right)}{s^2 + s\zeta\omega + \omega^2}$$

where:
 $F_1(s)$=first signal;
 $F_2(s)$=second signal;
 $\zeta$=damping ratio; and
 $\omega$=natural frequency of the first and second filters.

24. An apparatus for providing a signal indicative of velocity of a mass, said apparatus comprising:
 means for sensing acceleration of the mass and for providing an acceleration signal indicative of acceleration of the mass;
 means for sensing displacement of the mass and for providing a displacement signal indicative of displacement of the mass;

means for processing said acceleration signal to provide a first velocity component signal;

means for processing said displacement signal to provide a second velocity component signal; and means for combining the first and second velocity component signals to provide a signal indicative of velocity of the mass.

* * * * *